(12) United States Patent
Nafziger

(10) Patent No.: US 7,543,461 B2
(45) Date of Patent: Jun. 9, 2009

(54) VARIABLE RADIUS DEFLECTOR

(75) Inventor: Gregory W. Nafziger, Archbold, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 244 days.

(21) Appl. No.: 10/964,053

(22) Filed: Oct. 12, 2004

(65) Prior Publication Data
US 2006/0075785 A1   Apr. 13, 2006

(51) Int. Cl.
C03B 7/14 (2006.01)
(52) U.S. Cl. ............................. 65/304; 65/207; 65/221; 65/225; 65/165
(58) Field of Classification Search ................... 65/325, 65/225, 304, 165, 207, 221
See application file for complete search history.

(56) References Cited

U.S. PATENT DOCUMENTS

| | | | |
|---|---|---|---|
| 4,529,431 A  * | 7/1985  | Mumford | 65/225 |
| 4,772,306 A  * | 9/1988  | Davey et al. | 65/325 |
| 5,213,602 A  * | 5/1993  | Foster et al. | 65/304 |
| 5,254,150 A  * | 10/1993 | Riemer et al. | 65/225 |
| 5,298,049 A | 3/1994 | Meyer | |
| 5,549,727 A | 8/1996 | Meyer | |
| 5,599,370 A | 2/1997 | Struckmeier et al. | |
| 5,824,129 A | 10/1998 | Struckmeier et al. | |
| 5,846,283 A | 12/1998 | Struckmeier et al. | |
| 5,888,267 A | 3/1999 | Schumann et al. | |
| 5,935,287 A | 8/1999 | Graefe et al. | |
| 6,038,888 A | 3/2000 | Flynn et al. | |

FOREIGN PATENT DOCUMENTS

DE           101 52 962  A1     5/2003

* cited by examiner

*Primary Examiner*—Steven P Griffin
*Assistant Examiner*—Queenie Dehghan

(57) ABSTRACT

A gob deflector has an entry end for receiving molten glass gobs, an exit end for directing the glass gobs into a blank mold of a glassware forming machine, and a curved portion between the entry and exit ends. The curved portion has an arc defined by an upper curve contiguous with the inlet end of the deflector and a lower curve contiguous with the entry end of the deflector. The upper and lower curves have differing radii as a function of angle along the curved portion of the deflector.

3 Claims, 3 Drawing Sheets

US 7,543,461 B2

VARIABLE RADIUS DEFLECTOR

The present invention relates to glassware forming machines, and more particularly to the curvature of the deflector that directs molten glass gobs into the blank mold of a glassware forming machine.

BACKGROUND AND OBJECTS OF THE INVENTION

In individual section glassware forming machines, mold charges or gobs of molten glass are fed by a gob distributor along troughs to the machine sections in sequence, and then by deflectors at each machine section into the blank molds at that section. The deflectors have an arcuate contour to convert the downwardly angled motion along the troughs to vertical motion into the blank molds. U.S. Pat. No. 4,772,306 teaches that the centerline of the deflector lies along a spiral curve in which the radius varies as a function of angle. Thus, in FIG. 8 of the present application, the radius of the centerline of the deflector curve varies according to the equation $r=C/\theta^P$, where $\theta$ is angle from the deflector exit end, C is a constant that is determined at a selected $(r,\theta)$ coordinate pair, and P is an exponent that controls the shape of the curve. The deflector curve has a minimum radius at the entrance end from the associated trough, and a maximum radius at the exit end above the associated blank mold. The height of the deflector is controlled by the layout of the machine, and is specified as the intersection height a, which is the vertical distance above the deflector exit to a point that intersects the trough centerline.

A major concern in the design of gob deflectors is the normal or radial force exerted by the deflector on the gob due to centrifugal acceleration during travel of the glass gob along the deflector. A positive normal force throughout travel along the deflector is necessary to maintain control of the gob, and to control loading of the gob into the blank mold. However, excessive normal force increases heat transfer from the gob to the deflector, increases friction between the gob and the surface of the deflector, causes greater elongation of the gob, and cools the gob on the side in contact with the deflector, which undesirably can lead to distortion of the blow molded glass container. Furthermore, a high normal force at the exit end of the deflector would allow the gob to continue to travel outward as the gob leaves the exit end of the deflector, rather than vertically downwardly into the associated blank mold. A general object of the present invention is to provide a gob deflector that addresses these areas of concern.

SUMMARY OF THE INVENTION

In accordance with the present invention the curved portion of the deflector is defined by two spiral curves that connect at a central portion of the deflector. The spiral curves are reflected about a line perpendicular to the intersection of the two curves, so that the minimum radius of each spiral curve is at the point where the curves meet. The exponent P and constant C for each curve can be specified independently.

Thus, a gob deflector in accordance with one aspect of the present invention has an entry end for receiving molten glass gobs, an exit end for directing the glass gobs into a blank mold of a glassware forming machine, and a curved portion between the entry and exit ends. The curved portion has an arc defined by an upper curve contiguous with the entry end of the deflector and a lower curve contiguous with the exit end of the deflector. The upper and lower curves have radii as differing functions of angle along the curved portion of the deflector.

In the preferred embodiments of the invention, the lower curve adjacent to the exit end of the deflector is defined by the equation $r1=C1/\theta 1^{P1}$, where $r1$ is the radius at angle $\theta 1$, and C1 and P1 are constants. The upper curve adjacent to the entry end of the deflector is defined by the equation $r2=C2/\theta 2^{P2}$, where $r2$ is the radius at angle $\theta 2$, and C2 and P2 are constants. The curves have minimum radii $r1_{min}=r2_{min}$ where the curves meet at the central portion of the deflector curved portion. At least one of the constants P1 and P2 is non-zero. In the preferred embodiments, the constant P1 is non-zero, and the constant P2 may be non-zero or may be equal to zero such that the upper curve has a constant radius $r2=C2$.

BRIEF DESCRIPTION OF THE DRAWINGS

The invention, together with additional objects, features, advantages and aspects thereof, will best be understood from the following description, the appended claims and the accompanying drawings, in which:

DETAILED DESCRIPTION OF PREFERRED EMBODIMENTS

Figure 1:
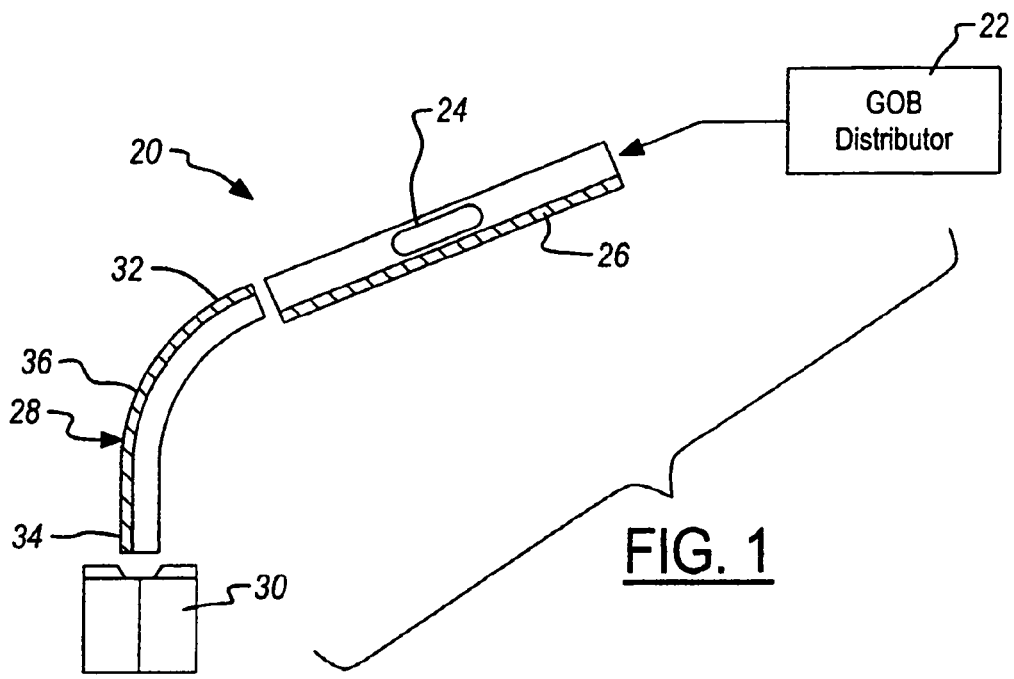
FIG. 1 is a schematic diagram of a gob feed system in accordance with one presently preferred embodiment of the invention.

FIG. 1 illustrates a molten glass gob delivery system 20 to one blank mold of an individual section glassware forming machine. A gob distributor 22 receives molten glass gobs 24 from a suitable source (not shown), and feeds the glass gobs along troughs 26 to the individual machine sections. At each machine section, one or more deflectors 28 receive and deflect gobs 24 into associated blank molds 30. Each gob deflector 28 has an entry end 32 for receiving gobs from an associated trough 28, an exit end 34 for directing the gobs vertically downwardly into an associated blank mold 30, and a curved portion 36 that extends between the entry and exit ends. It will be appreciated that FIG. 1 schematically illustrates only one trough 26 and deflector 28 associated with one blank mold 30 of one machine section. Each machine section may contain several blank molds 30 with associated deflectors 28 and troughs 26, with associated gobs 24 being fed to troughs 26 by gob distributor 22.

Figure 2:
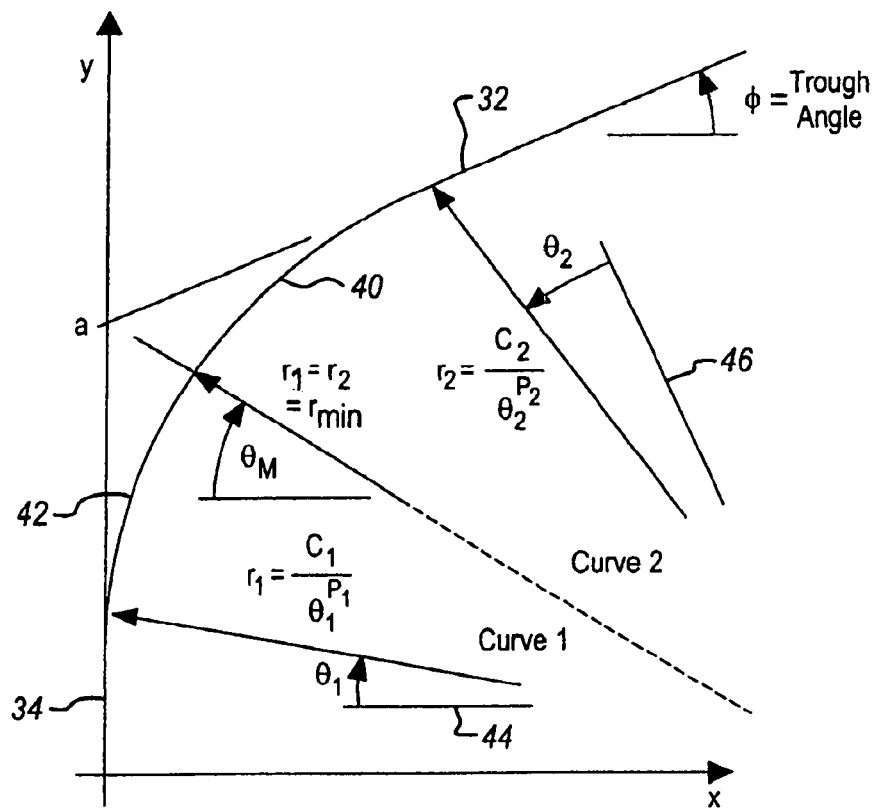
FIG. 2 is a graph that illustrates curvature of the gob deflector in the system of FIG. 1.

FIG. 2 illustrates the curvature of the center line of deflector central portion 36 between entry end 32 and exit end 34. The curvature of central portion 36 has an arc defined by an upper curve 40 contiguous with entry end 32 and a lower curve 42 contiguous with exit end 34. Lower curve 42 has a radius $r1=C1/\theta 1^{P1}$, where $r1$ is the radius of curvature, $\theta 1$ is the angle from a line 44 perpendicular to the exit angle of the deflector (preferably horizontal), and C1 and P1 are constants. Upper curve portion 40 has a radius of curvature $r2=C2/\theta 2^{P2}$, where $r2$ is radius of curvature, $\theta 2$ is angle from a line 46 perpendicular to the entrance angle to the deflector (trough angle $\phi$), and C2 P2 are constants. At the central portion of the deflector where curves 40,42 meet, at the angle θM from line 44, r1=r2=$r_{min}$. Intersection height a and trough angle φ are determined by the design of the glassware forming machine. Upper curve 40 preferably is tangent with trough angle φ, and lower curve 42 preferably is tangent with the vertical centerline of blank mold 30.

Figure 3:
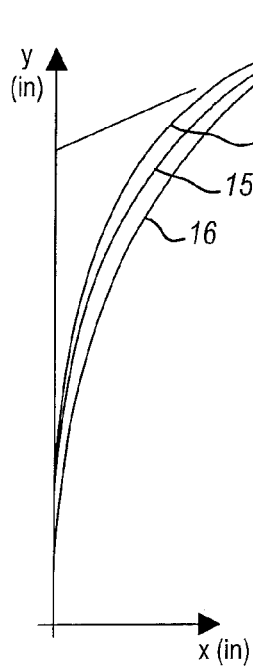
FIG. 3 is a graphic illustration of deflector curvature in accordance with two preferred embodiments of the invention as compared with the prior art.

FIG. 3 illustrates the curvature of three exemplary deflectors, design 15 and design 16 in accordance with embodiments of the present invention, and a standard deflector 17 in accordance with the prior art. The following table gives parameters for the three designs:

| Design | Min. Radius (r min, inches) | P1 | C1 | P2 | C2 | Match Angle (θ M, degrees) |
|---|---|---|---|---|---|---|
| 17 | 12.84 | 0.6193 | 14.0153 | N/A | N/A | 66.0000 |
| 15 | 25.00 | 0.6 | 13.9097 | 0 | 25 | 21.5650 |
| 16 | 25.00 | 0.4 | 24.1950 | 0 | 25 | 52.7945 |

Intersection height a for each deflector is 29.958 inches, and trough angle φ for each design is 24 degrees.

Figure 4:
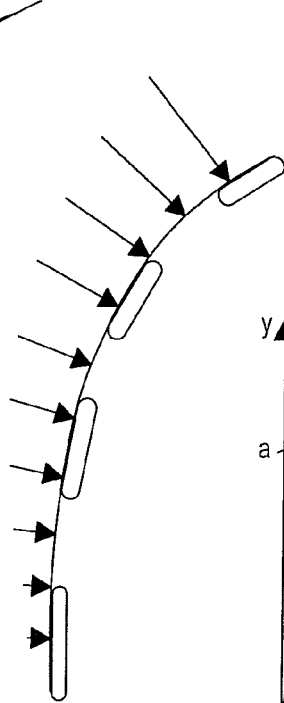
FIG. 4 is a schematic diagram that illustrates normal force applied to the glass gob during travel along the deflector.
Figure 8:
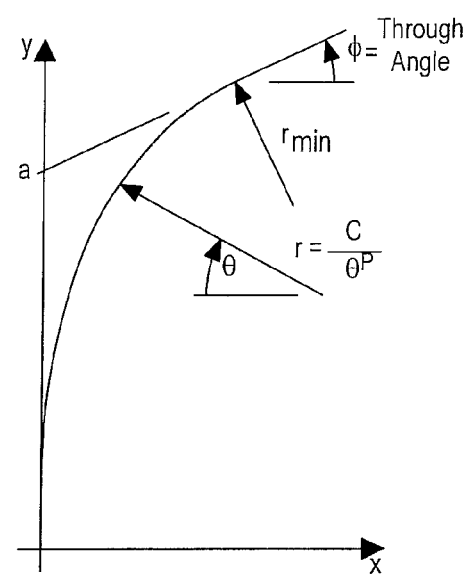
FIG. 8 is graph that illustrates deflector curvature in accordance with the prior art.
Figure 5:
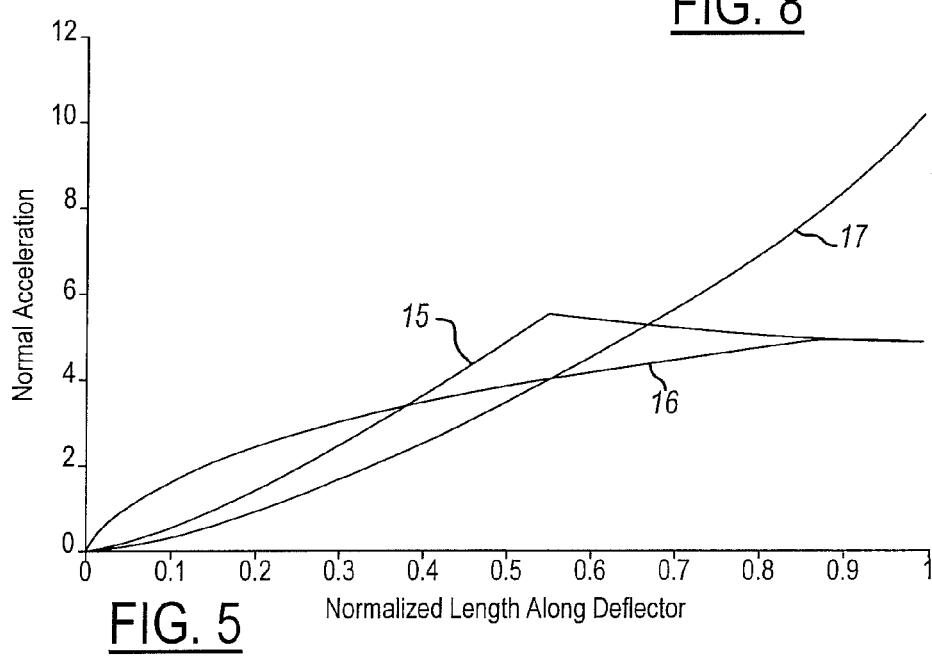
FIGS. 5-7 are graphs that illustrate operation of two presently preferred embodiments of the invention.

FIG. 4 is a schematic illustration of normal or radial force exerted by the deflector on the glass gob due to centrifugal acceleration, with the magnitude of the normal force being illustrated by the lengths of the arrows perpendicular to the curvature of the deflector. Normal accelerations for designs 15, 16 and 17 are shown in FIG. 5. For all examples, the gob entrance velocity is 6 m/s and coefficient of friction is 0.125. The upper right of each curve is the acceleration at the entrance to the deflector and the lower left is acceleration at the exit. The analysis shows that the normal acceleration at the entry end of the deflector is drastically reduced by designs 15 and 16 in accordance with the present invention. Also, the normal acceleration approaches zero asymptotically in design 15, and approaches zero more abruptly in design 16. (The normal acceleration approaches zero approximately linearly for P1=0.5.) Constant P1 preferably is in the range of 0.4 to 0.7. Constant P2 preferably is in the range of zero to 0.5.

Figure 6:
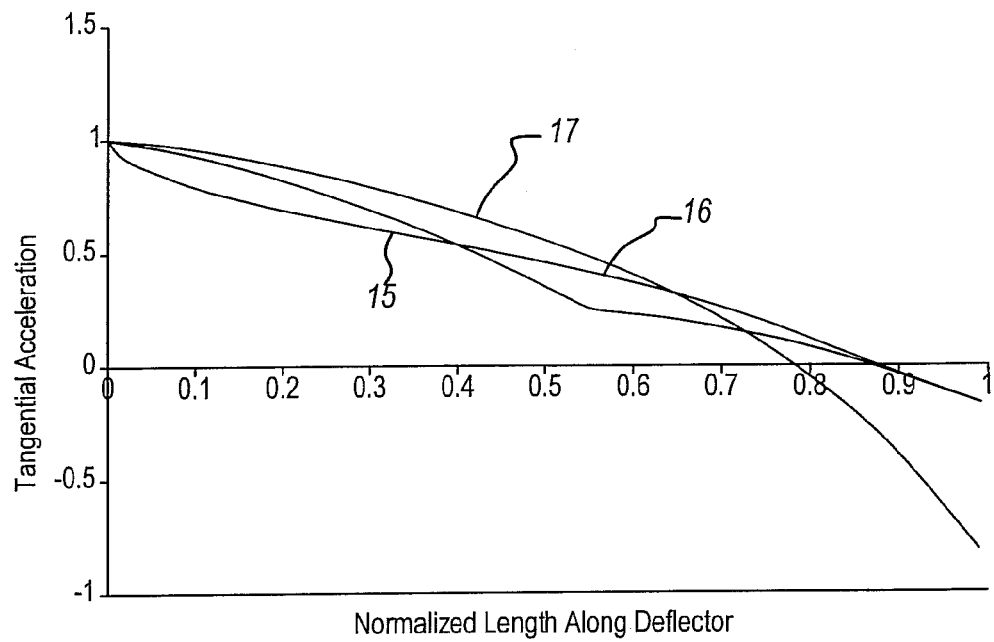
Figure 7:
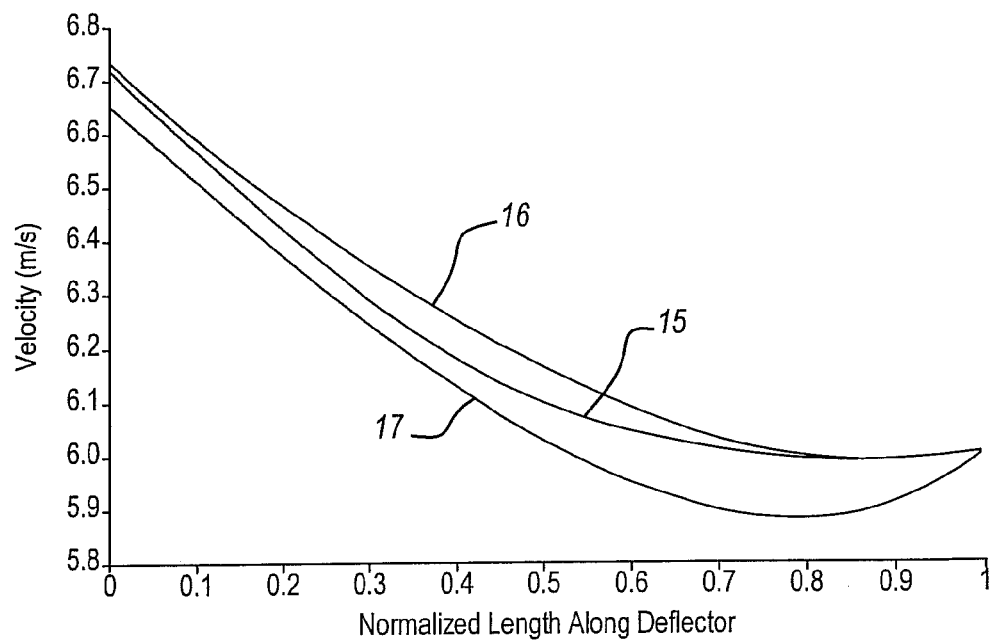

FIGS. 6 and 7 respectively illustrate tangential acceleration and velocity for designs 15, 16 and 17, with the right end of each curve at the entrance to the deflector and the left end of each curve at the exit end of the deflector. As shown in FIG. 6, the glass gob has less deceleration at the entrance end of deflector designs 15 and 16, and therefore slightly higher velocities (FIG. 7) throughout the length of the deflector.

There thus has been disclosed a gob deflector that fully achieves all of the objects and aims previously set forth. The present invention has been disclosed in conjunction with a number of presently preferred embodiments, and various modifications and variations have been discussed. Other modifications and variations readily will suggest themselves to persons of ordinary skill in the art without departing from the scope of the present invention. The present invention is intended to embrace all such modifications and variations as fall within the spirit and broad scope of the appended claims.

The invention claimed is:

1. A gob deflector having an entry end for receiving molten glass gobs and exit end for directing the glass gobs into a blank mold of a glassware forming machine, said deflector having a continuous curved portion between said entry and exit ends, said curved portion having continuously concave arc defined by an upper curve contiguous with said entry end, and a lower curve different from said upper curve and contiguous with said exit end, said lower curve being defined by the equation $r1=C1/\theta 1^{P1}$, where r1 is radius at angle θ1, and C1 and P1 are constants, said upper curve being defined by the equation $r2=C2/\theta 2^{P2}$, where r2 is radius at angle θ2, and C2 and P2 are constants, said curves having minimum radii $r1_{min}=r2_{min}$ where said curves meet at a central portion of said curved portion, said constant P1 being non-zero and in the range of 0.4 to 0.7.

2. The deflector set forth in claim 1 wherein said constant P2 is non-zero.

3. The deflector set forth in claim 1 wherein said constant P2 is zero, such that said upper curve portion has a constant radius r2=C2.

* * * * *